United States Patent [19]

Killough

[11] Patent Number: 4,678,033

[45] Date of Patent: Jul. 7, 1987

[54] HYDROCARBON RECOVERY PROCESS

[75] Inventor: John E. Killough, Plano, Tex.

[73] Assignee: Atlantic Richfield Company, Los Angeles, Calif.

[21] Appl. No.: 904,532

[22] Filed: Sep. 8, 1986

[51] Int. Cl.$^4$ .............................................. E21B 43/22
[52] U.S. Cl. ..................................... 166/246; 166/248
[58] Field of Search ............... 166/246, 248, 60, 65.1, 166/268, 305.1

[56] References Cited

U.S. PATENT DOCUMENTS

| | | | |
|---|---|---|---|
| 2,799,641 | 7/1957 | Bell | 166/248 |
| 2,807,570 | 9/1957 | Updegraff | 166/246 |
| 3,278,335 | 10/1966 | Hitzman | 166/246 X |
| 3,332,487 | 7/1967 | Jones | 166/246 |
| 3,642,066 | 2/1972 | Gill | 166/248 |
| 3,782,465 | 1/1974 | Bell et al. | 166/248 |
| 4,450,908 | 5/1984 | Hitzman | 166/246 |
| 4,588,506 | 5/1986 | Raymond et al. | 166/246 X |

FOREIGN PATENT DOCUMENTS 578448 10/1977 U.S.S.R. .

*Primary Examiner*—Stephen J. Novosad
*Attorney, Agent, or Firm*—F. Lindsey Scott

[57] ABSTRACT

A process for recovering hydrocarbons from a subterranean, hydrocarbon-bearing formation comprising: (a) introducing microbes into the formation, the microbes being effective to render at least a portion of the hydrocarbons in the formation more easily recoverable; (b) passing electrical energy through at least a portion of the formation to increase the mobility of the microbes in the formation; and (c) recovering hydrocarbons from the formation.

23 Claims, No Drawings

HYDROCARBON RECOVERY PROCESS

This invention relates to an improved process for recovery of hydrocarbons from a porous formation or reservoir. More particularly, the invention relates to an improved hydrocarbon recovery process which involves introducing one or more of certain microbes into the formation.

A large portion of the original hydrocarbons (oil) in place in many hydrocarbon-bearing subterranean formations remains in place after primary production and water flooding. Certain hydrocarbon-bearing subterranean formations are not susceptible to primary production and water flooding techniques. As oil reserves dwindle and exploration for new discoveries becomes more difficult and costly, the use of enhanced oil recovery (EOR) techniques on previously discovered resources will play an increasingly important role in the overall production of crude petroleum.

Microbial EOR has been investigated for many years as a possibility of producing oil that would otherwise be uneconomical. The microbial EOR process is envisioned to involve chemical/physical change or changes in the hydrocarbons contained in the formation brought about by the action of the microbes with or without the addition of nutrients from the surface. The chemical/physical changes caused by the action of the microbes renders the hydrocarbons contained in the formation after microbial action more susceptible to recovery, e.g., using primary production and/or other production techniques, relative to the hydrocarbons contained in the formation before microbial action. One of the difficulties in the past with microbial EOR has been the problem of ineffective contact of the formation fluids by the microbes. This often results because of the low mobility of the microbes in the formation so that only a very limited portion of the formation is subjected to effective microbial action. Improving the mobility of microbes in subterranean, hydrocarbon-bearing formation would clearly be advantageous. Also, previous microbial hydrocarbon recovery techniques have depended on the ability to inject substantial quantities of microbes or nutrients into the formation. In many situations of interest, this may not be possible.

Another alternate and distinct EOR processing option involves the use of electrical energy in the formation. By strategically placing electrodes at or near one or more of the production and/or injection wells in a formation, electrical energy can be introduced into the formation. This electrical energy results in heat production which, in turn results in heating of the formation, e.g., near the production means. These increased temperatures reduce the viscosity of the hydrocarbons in this heated formation. The less viscous hydrocarbons are more easily recovered through the production wells.

This electrical enhanced oil recovery (EEOR) processing option has a number of significant drawbacks. For example, this use of electrical energy is relatively expensive. To be at all economically viable, only a relatively small portion of the formation, i.e., surrounding the production wells, is heated to reduce hydrocarbon viscosity. Thus, EEOR has little or no impact on hydrocarbons in the formation away from the production wells. Additional wells can be drilled and/or more electrical energy can be used. However, both approaches result in substantially increased costs are generally uneconomical.

Therefore, one object of the present invention is to provide an improved process for recovering hydrocarbons from a subterranean, hydrocarbon-bearing formation.

Another object of the invention is to provide an improved hydrocarbon recovery process involving microbial action.

A further object of the invention is to provide an improved hydrocarbon recovery process involving passing electrical energy through a subterranean, hydrocarbon-bearing formation. Other objects and advantages of the present invention will become apparent hereinafter.

An improved process for recovering hydrocarbons from a subterranean, hydrocarbon-bearing formation has been discovered. In one broad aspect, the process comprises: (a) introducing microbes into the formation, the microbes being capable of acting to render at least a portion of the hydrocarbons in the formation after microbial action more easily recoverable; (b) passing electrical energy through at least a portion of the formation to increase the mobility of the microbes in the formation; and (c) recovering hydrocarbons from the formation.

The present invention provides substantial advantages. For example, the use of low levels of electrical energy has been found to enhance the mobility of the microbes in the reservoir or formation so that more of the formation is subjected to microbial action. The amount of electrical energy used is often only a very minor portion, i.e., less than about 1%, of the electrical energy (on a per unit time basis) contemplated to be used in conventional EEOR processes. This leads to a significant cost advantage for the present process. By introducing only a relatively small population of microbes, e.g., bacteria; and directing and enhancing their mobility with electric current, injection of substantial amounts of fluid may be avoided. Under properly controlled environmental conditions and using electrical energy to increase the mobility of the microbes, population growth of the microbes is sufficiently rapid so that a substantial portion of the reservoir or formation is subjected to microbial action in a relatively limited period of time.

Because the amount of current applied to the formation is relatively small, the cost of such a system would be relatively low and/or one could pass the electrical energy through the formation for a substantial time, e.g., a period sufficient to allow the microbes to act on a substantial portion of the hydrocarbons in the formation to change one or more of the physical and/or chemical properties of the hydrocarbons. The present process is particularly attractive to produce formations in which previous technology is uneconomical, and it is likely that the reservoir may not be exploited for many years if at all.

The microbes useful in the present invention may be any one or more species of organisms capable of acting to render at least a portion of the hydrocarbon is the particular formation more easily recoverable. By "more easily recoverable" is meant that the hydrocarbons after the microbial action of the present invention are more easily recovered using primary production and/or conventional EOR processes relative to the hydrocarbons before such microbial action. Any one or more of the chemical or physical properties of the formation hydrocarbons may be affected or changed as the result of microbial action. In one particular embodiment, the microbes are effective to reduce the average molecular weight of the hydrocarbons in the formation. These lower weight hydrocarbons are generally less viscous and therefore, more easily recoverable than the original, higher molecular weight hydrocarbons. The specific microbes employed depends on many factors, for example, the particular formation involved, the specific hydrocarbons in the formation, and the desired microbial action on these formation hydrocarbons. The microbes may be aerobic or anaerobic and may or may not require one or more additional nutrients to be included, e.g., naturally incurring or injected, in the formation. For example, if anaerobic bacilli are employed, the formation, in particular the connate water in the formation, should contain one or more of certain nutrients, such as phosphate ion, to help support the microbes.

The environment in the formation should be such as to facilitate growth of the particular microbes employed. Since much of the environment in any particular formation is pre-set, the microbe used is chosen to "fit" the formation rather than vice versa. Nutrients and/or other materials useful to support and/or encourage microbe growth may be injected into the formation, e.g., through one or more wells drilled into the formation. Highly mobile microbes, such as flagellated or ciliated bacilli, are particularly useful in the present invention. The microbes preferably are sized so that they are mobile in the connate water of the formation. Microbes which have a maximum linear dimension, i.e., length, width or height, of less than about 5 microns are more preferred, with microbes having a maximum linear dimension less than about 3 microns being still more preferred.

When appropriate, the term "microbes" as used herein refers not only to the microbes introduced initially into the formation, but also to the microbes derived, directly or indirectly, from the reproduction of these initially introduced microbes.

The microbes may be introduced into the formation using any suitable means. For example, the microbes may be injected into the formation through one or more wellbores drilled into the formation, e.g., from the earth's surface. Such wellbores may also be used to inject one or more additional materials or nutrients which act to facilitate or support the growth of the microbes in the formation. In addition, the wellbores may be used to recover hydrocarbons from the formation after microbial action. For example, certain of the well bores may act as production wells through which hydrocarbon flows from the formation to the earth's surface, while one or more other wellbores may be used as injection wells through which water and/or other fluids are injected into the formation to enhance the recovery of hydrocarbons, e.g., through the production wells.

Step (b) of the present process involves passing electrical energy through at least a portion of the formation to increase the mobility of the microbes. Any suitable means useful to pass the desired, preferably predetermined, amount of electrical energy into the formation may be employed. For example, oppositely charged electrodes may be strategically placed in or near the hydrocarbon bearing formation, e.g., in or near wellbores drilled into the formation. These oppositely charged electrodes are in electric communication with each other so that an electric current can flow between the electrodes. An electric potential is applied across the oppositely charged electrodes which causes a current to flow between the electrodes in the formation.

The electrical energy or current caused to be passed through the formation is preferably less than 1% of the current normally contemplated for use in conventional EEOR processing. Such EEOR processing is typically designed to substantially increase the temperature in the formation so that the contained hydrocarbons become less viscous. In the present process, the amount of electrical energy passed throught the formation is preferably such as to raise the average formation temperature because of the passing of electrical energy alone, if at all, by less than 10° F., more preferably less than about 5° F., and still more preferably to not substantially raise the average formation temperature. The microbial action may cause an increase in the formation temperature, but this effect is not considered in the above temperature ranges. Increasing the formation temperature by about 100° F. or more, as is contemplated for typical EEOR processing, may be detrimental to the microbes. In any event, it is clear that the present step (b) is clearly distinct from the typical EEOR processing.

The amount of electrical energy passed through the formation in step (b) of the present process may vary widely depending, for example, on the formation and formation conditions involved, and the microbes being employed.

Preferably, the amount of electrical energy passed through the formation is such that less than about 50, more preferably less than about 20, and still more preferably less than about 10, milliamperes pass through the formation. These levels of electrical energy have been found to increase the mobility of the microbes in the formation while being relatively inexpensive to continue for relatively long periods of time.

The present invention may act to speed microbial action on the hydrocarbons in a formation and/or to make the microbes available to a larger portion of the total hydrocarbons in the formation. However, in real life situations, the time for effective microbial action on a significant portion of a formation's hydrocarbons is still relatively long. Thus, it is preferred that step (b) of the present invention be continued at least periodically for a period of time in the range of about one month to about ten years, more preferably about two months to about five years. Although the electrical energy can be passed through the formation on a periodic basis, i.e., stopped and started repeatedly over the desired period of time, it is preferred to pass such electrical energy through the formation on a substantially continuous basis.

The following non-limiting example illustrates certain of the advantages of the present invention.

EXAMPLE

A subterranean, crude petroleum-bearing, porous reservoir is located. However, because of the nature of the hydrocarbons in the reservoir, it is determined that the crude petroleum in the reservoir is so viscous that conventional primary recovery and enhanced oil recovery methods are not effective to economically recover this crude petroleum from this reservoir.

A series of strategically located production and injection wells are drilled into the reservoir. Relatively small populations of flagellated, anaerobic bacilli are introduced one time into each of the production wells. These microbes are known to act on the particular hydrocarbons in the reservoir to reduce the molecular weight and the viscosity of the hydrocarbons. The bacilli have a maximum linear dimension of between one to two microns and are sufficiently small such that they are mobile in the connate water of the reservoir. Also, sufficient phosphate ion is introduced into the reservoir through the production wells, as needed, to insure that the connate water in the reservoir has a sufficient concentration of phosphate ions to support tha anaerobic bacilli.

Oppositely charged electrodes are placed in the production wells and in the injection wells so that electrical current would flow through the reservoir from the production wells to the injection wells. An electrical potential is applied across the electrodes so that a current of three milliamperes flows through the reservoir. This electrical energy is passed through the reservoir substantially continuously for a period of 18 months. After this period of time, it is determined that the microbes have contacted and acted upon the hydrocarbons in a large portion of the reservoir.

After this 18 month period, the application of electrical energy is stopped. Seawater (brine) is injected into the reservoir through the injection wells, and a quantity of crude petroleum is economically recovered from the reservoir through the production wells.

While this invention has been described with respect to various specific examples and embodiments, it is to be understood that the invention is not limited thereto and that it can be variously practiced within the scope of the following claims.

The embodiments of the present invention in which an exclusive property or privilege is claimed are as follows:

1. A process for recovering hydrocarbons from a subterranean, hydrocarbon-bearing formation comprising:
   (a) introducing microbes into said formation, said microbes being capable of acting to render at least a portion of said hydrocarbons in said formation more easily recoverable;
   (b) passing electrical energy through at least a portion of said formation without substantially raising the temperature of the formation; and
   (c) recovering hydrocarbons from said formation.

2. The process of claim 1 wherein said microbes are effective to reduce the average molecular weight of said hydrocarbons in said formation.

3. The process of claim 1 wherein said formation includes connate water and said microbes are sized to be mobile in said connate water of said formation.

4. The process of claim 3 wherein said microbes have a maximum linear dimension of less than about five microns.

5. The process of claim 3 wherein said microbes have a maximum linear dimension of less than about three microns.

6. The process of claim 1 which further comprises introducing at least one additional material into said formation effective to act per a nutrient for said microbes in said formation.

7. The process of claim 3 wherein said connate water includes at least one additional material effective to act as a nutrient for said microbes in said formation.

8. The process of claim 1 wherein said microbes are flagellated or ciliated bacilli.

9. The process of claim 3 wherein said microbes are flagellated or ciliated bacilli.

10. The process of claim 1 wherein step (b) is continued at least periodically for a period of time in the range of about one month to about ten years.

11. The process of claim 1 wherein step (b) is continued at least periodically for a period of time in the range of about two months to about five years.

12. The process of claim 10 wherein step (b) occurs substantially continuously.

13. The process of claim 11 wherein step (b) occurs substantially continuously.

14. The process of claim 1 wherein step (b) is conducted so that no more than about 50 milliamperes pass through said formation.

15. The process of claim 1 wherein step (b) is conducted so that no more than about 20 milliamperes pass through said formation.

16. The process of claim 1 wherein step (b) has no substantial detrimental effect on said microbes in said formation.

17. The process of claim 3 wherein step (b) has no substantial detrimental effect on said microbes in said formation.

18. The process of claim 1 wherein step (c) occurs after step (b).

19. The process of claim 2 wherein step (c) occurs after step (b).

20. The process of claim 3 wherein step (c) occurs after step (b).

21. The process of claim 1 wherein said hydrocarbon is crude petroleum.

22. The process of claim 2 wherein said hydrocarbon is crude petroleum.

23. The process of claim 3 wherein said hydrocarbon is crude petrolem.

* * * * *

UNITED STATES PATENT OFFICE
CERTIFICATE OF CORRECTION

PATENT NO. : 4,678,033
DATED : July 7, 1987
INVENTOR(S) : John E. Killough

It is certified that error appears in the above-identified patent and that said Letters Patent are hereby corrected as shown below:

On the last page, Column 5, line 43, after "of said formation", please inert --to increase mobility of said microbes in said formation--.

Signed and Sealed this

Sixteenth Day of February, 1988

Attest:

DONALD J. QUIGG

Attesting Officer     Commissioner of Patents and Trademarks